UNITED STATES PATENT OFFICE.

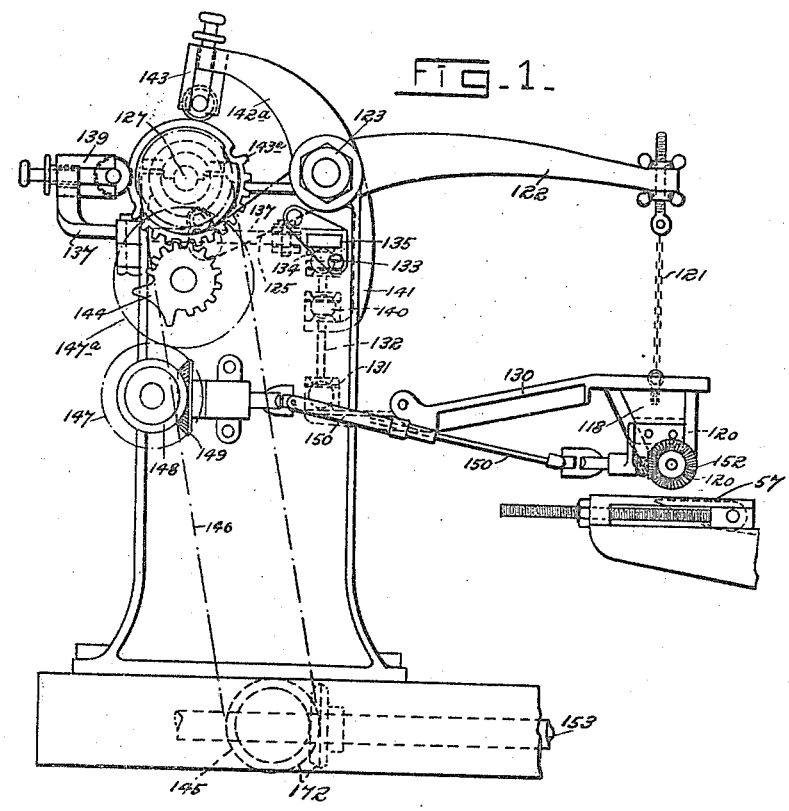

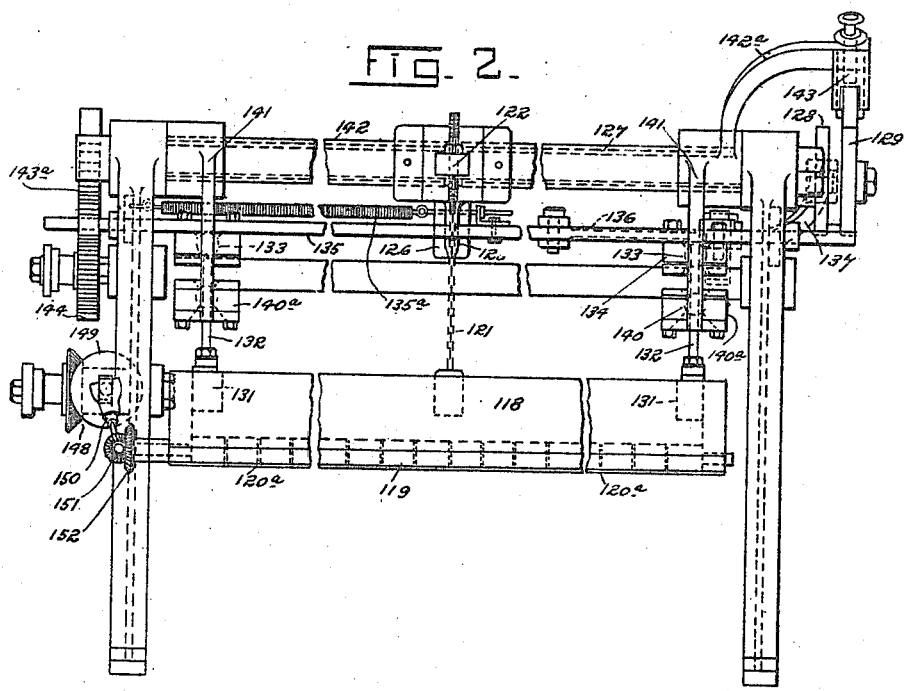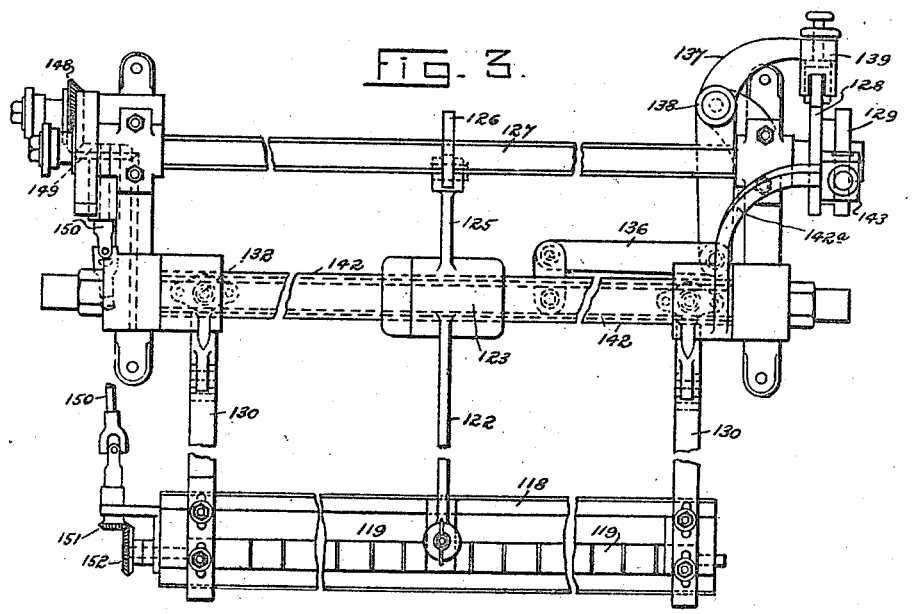

GEORGE WHITE, OF JERSEY CITY, NEW JERSEY, AND GEORGE SAMUEL BAKER AND GEORGE RALPH BAKER, OF LONDON, ENGLAND, ASSIGNORS TO PANAYIOTIS D. PANOULIAS, OF JERSEY CITY, NEW JERSEY.

APPARATUS FOR DECORATING CONFECTIONERY AND THE LIKE.

1,268,195.  Specification of Letters Patent.  Patented June 4, 1918.

Original application filed April 20, 1916, Serial No. 92,339. Divided and this application filed September 15, 1916. Serial No. 120,236.

*To all whom it may concern:*

Be it known that we, GEORGE WHITE, a citizen of the United States of America, residing at Jersey City, in the county of Hudson, United States of America, and GEORGE SAMUEL BAKER and GEORGE RALPH BAKER, both subjects of the King of England, and both residing at London, in England, have invented certain new and useful Improvements in Apparatus for Decorating Confectionery and the like, of which the following is a specification.

This invention relates to apparatus for decorating confectionery and like goods, that is to say, it provides for the application to said goods of any desired design or decoration formed of a substance, such as chocolate, or icing, of a semi-liquid or more or less plastic consistency, which is contained in a receptacle adapted to discharge said substance from above on to the goods and which is given movements the amplitude and sequence of which determine the character or design of the decoration.

The invention, while applicable generally to all kinds of confectionery and like goods as a self contained apparatus, is of particular service as an adjunct or attachment to confectionery coating machines for applying a device or decoration to the goods after the coating thereof, for instance, with chocolate.

The invention primarily consists in means for mechanically imparting to the decorating elements positive vertical, lateral and longitudinal movements or combinations thereof in relation to the goods by means of a series of cams.

The invention also consists in making certain of the cams integral, each number or group of cams representing a particular design, so that the whole may be changed as a unit when it is desired to vary the design.

The invention also comprises details of construction arrangement or combinations of parts hereinafter fully described and specifically pointed out in the appended claims.

As an example a practical embodiment of the invention is represented in the accompanying drawings in which Figures 1, 2 and 3 are respectively a side elevation, end elevation and plan view of the improved decorating apparatus.

The apparatus comprises a jacketed receptacle 118 for the decorating substance and containing one or more grooved rollers 119 and co-acting scrapers 120 by which a small quantity of said substance may be delivered through an aperture 120$^a$ or series thereof in the base of the tank. Where a number of said apertures are provided they are spaced in accordance with the goods to be decorated, these goods being for example spaced or alined on a conveyer 57 part of which is shown in Fig. 1.

According to the design of decoration to be applied to the goods, different movements are imparted to the receptacle 118, and for this purpose it is necessary that it should be mounted in a universal fashion so as to be capable of movement in any direction. It is further desirable that the goods to be decorated should come into contact with the discharge portion or portions of the receptacle 118 in order that a fair start of the decorating substance on the goods may be possible, after which the receptacle is raised and given the other movements required. The receptacle is adjustably connected by a chain 121 to one arm 122 of a double-armed lever pivoted at 123 on a sleeve 142, the other arm 125 of said lever being acted on by a cam 126 on a shaft 127 so that vertical rising and falling movements may be given to the receptacle.

The mechanism to impart the other desired movements to the receptacle comprises two coaxial cams 128 and 129 also mounted on the shaft 127, the particular contours given to these cams determining the character of the decoration. At the ends of two arms 130 rigidly but detachably attached to the receptacle 118 are ball-and-socket bearings 131 in which rods 132 are universally jointed. The opposite end of each rod 132 carries a ball 133 mounted in a socket 134, the two sockets being attached to a rectangular bar 135 extending across the machine and capable of lateral movement only by means of a link 136 connected to an arm 137 fulcrumed at 138 and having a roller attachment 139 acted on by the aforesaid cam 128. The bar 135 is returned to normal position by means of a spring 135$^a$ connected thereto and to a frame part.

On the rods 132 are also mounted further intermediate balls 140 bored out to slide on the rods and carried in sockets 140ª attached to two rocking levers 141 keyed to a sleeve 142, one of said levers having an arm 142ª provided with a roller attachment 143 acted on by the aforesaid cam 129.

It will be clear from the above description that lateral movement in relation to the goods may be imparted to the receptacle 118 by sliding the bar 135 by means of the cam 128 and connections, and similarly, longitudinal movement in relation to the goods due to rocking of the two levers 141 by the cam 129 and consequent displacement of the balls 140. A combination of these two movements will, with suitably designed cams, render it possible to describe any desired design in one plane with the decorating receptacle. The balls 133 adjacent the bar 135 act as fulcra for the displacement of the intermediate balls 140 and similarly these latter act as fulcra for the lateral movement of the balls 133. In the vertical raising and lowering movements of the receptacle the ball-and-socket bearings 131 form fulcra about which the arms 130 secured to the receptacle may rock.

The cams 128 and 129 may be integral and removable for replacement by others according to the design required and means, such as the displaceability of the rollers in the attachments 139 and 143, are provided for fine adjustment of the receptacle 118 to meet varying sizes and positions of the coated goods.

Intermittent movement may be given to the cam shaft 127 by means of interrupted or stop-motion gearing 143ª 144 driven as by a chain and chain-wheel 146, 145 actuated from a driving shaft 153 through bevel gearing 172 and for driving the roller or rollers 119 in the receptacle 118 further gearing is shown comprising spur-wheel 147 driven by gear 147ª from the shaft of the gear 144, bevel-wheels 148, 149, flexible shaft 150 and bevel-gears 151 and 152, the latter on the spindle of the roller.

What we claim as our invention and desire to secure by Letters Patent of the United States is:—

1. A decorating device for confectionery comprising a decorating element, means for supply of decorating material thereto, and a plurality of cams adapted to respectively impart to said element positive vertical, lateral and longitudinal movements and combinations of said movements in relation to the goods.

2. A decorating device for confectionery comprising a receptacle adapted to contain decorating material and to discharge same on to the goods from above, systems of universally and flexibly jointed members supporting said receptacle, and a plurality of cams acting through said jointed members and adapted respectively to impart to the receptacle positive vertical, lateral and longitudinal movements and combinations thereof in relation to the goods.

3. A decorating device for confectionery comprising a decorating element, flexible supporting means for said element including rods provided at each end with ball joints and other ball joints intermediate said first mentioned joints and a plurality of cams adapted to act through said flexible supporting means to impart positive vertical, lateral and longitudinal movements and combinations thereof to said decorating element in relation to the goods.

4. A decorating device for confectionery comprising a decorating element, means for supply of decorating material thereto, and a plurality of cams adapted to respectively impart to said element positive vertical, lateral and longitudinal movements and combinations thereof in relation to the goods, certain of said cams being integral and interchangeable as a unit for the purpose of varying the character of the decorative design.

5. A decorating device for confectionery comprising a receptacle adapted to contain decorating material and provided with a plurality of spaced discharge apertures, a grooved roller or rollers within said receptacle for controlling the discharge of the decorating material through said apertures, systems of universally and flexibly jointed members supporting said receptacle, and a plurality of cams acting through said jointed members and adapted respectively to impart positive vertical, lateral and longitudinal movements or combinations thereof to said receptacle in relation to the goods.

6. A decorating device for confectionery comprising a receptacle adapted to contain decorating material and to discharge same on to the goods from above, and means for imparting vertical movements to said receptacle in relation to the goods comprising a double-armed lever, a cam adapted to operate one arm of same, and a chain between the other arm of said lever and the receptacle.

7. A decorating device for confectionery, comprising, in combination, a receptacle adapted to contain decorating material and to discharge such material upon the goods from above, means for imparting vertical movements to said receptacle in relation to the goods, comprising a double-armed lever, a cam adapted to operate one arm of said lever, and a chain interposed between the other arm of the lever and the receptacle, means for imparting lateral movement to said receptacle in relation to the goods, said means comprising rods connected to said receptacle, ball-and-socket joints at the ends of said rods, a transversely-movable bar in connection with said rods and a cam acting on said bar, and means for imparting longitudinal movements to said receptacle in relation to the goods, said means including the rods and ball-and-socket joints aforesaid, and in addition thereto, flexible connections intermediate the ends of said rods, and a cam acting on said connections.

8. A decorating device for confectionery, comprising means for discharging decorating material, suspension rods connected with said means, control mechanism connected with the upper ends of said rods, to move them horizontally in one direction, ball-and-socket joints having a sliding engagement with the central or intermediate portions of said rods, and control means, connected with said ball-and-socket joints, to move the suspension rods horizontally in a direction transverse to the one first mentioned.

9. A decorating device for confectionery, comprising a decorating element, and a plurality of control mechanisms adapted to respectively impart to said element positive vertical, lateral, and longitudinal movements and combinations of such movements, in relation to the goods.

10. A decorating device for confectionery, comprising a decorating element, separate means for imparting thereto up-and-down, lateral, and longitudinal movements respectively, in relation to the goods, and means causing said element to carry a supply of decorating material and deposit the same on the goods.

In witness whereof we have signed this specification in the presence of two witnesses.

GEORGE WHITE.
GEORGE SAMUEL BAKER.
GEORGE RALPH BAKER.

Witnesses:
H. D. JAMESON,
ALFRED L. PARISH.

Copies of this patent may be obtained for five cents each, by addressing the "Commissioner of Patents, Washington, D. C."